Aug. 25, 1953 E. L. ELWELL 2,649,744
APPARATUS FOR MAKING COMPOSITE ICE-CREAM CONFECTIONS
Filed Dec. 15, 1949 4 Sheets-Sheet 1
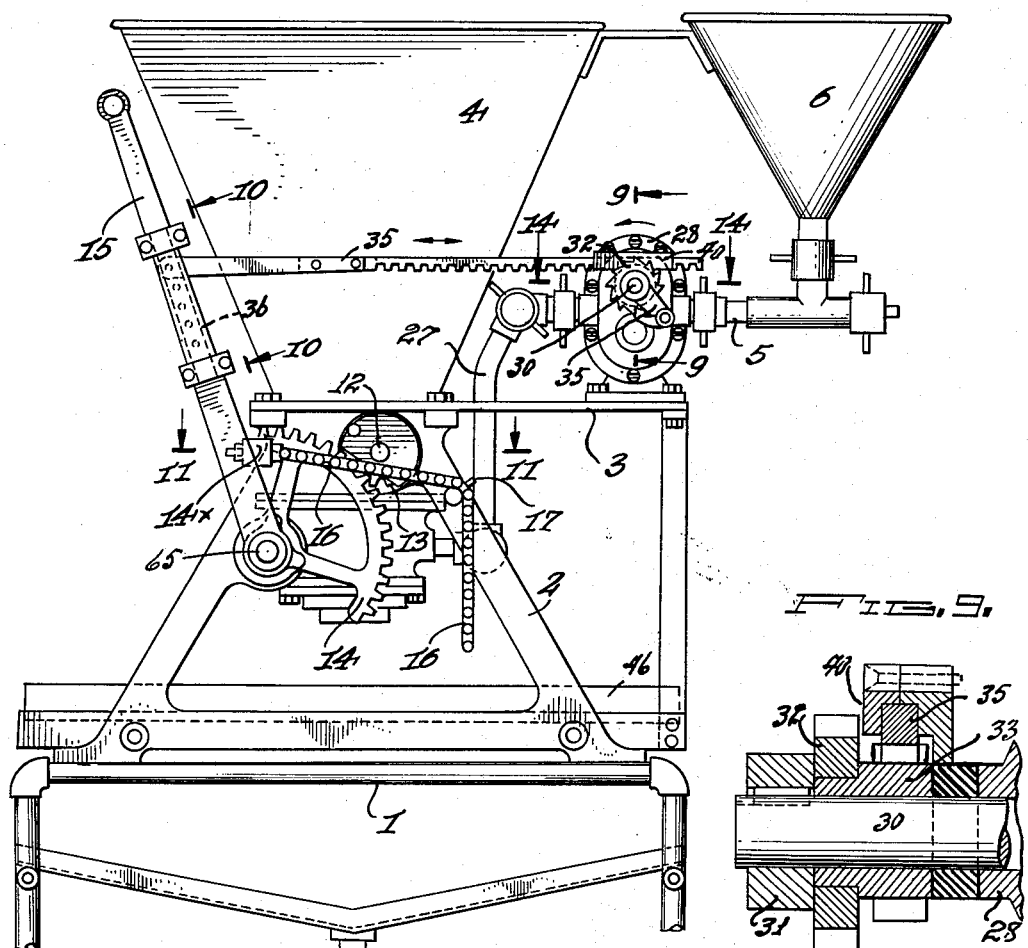
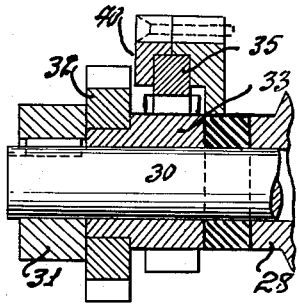
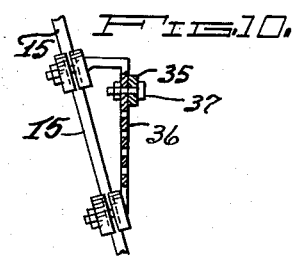
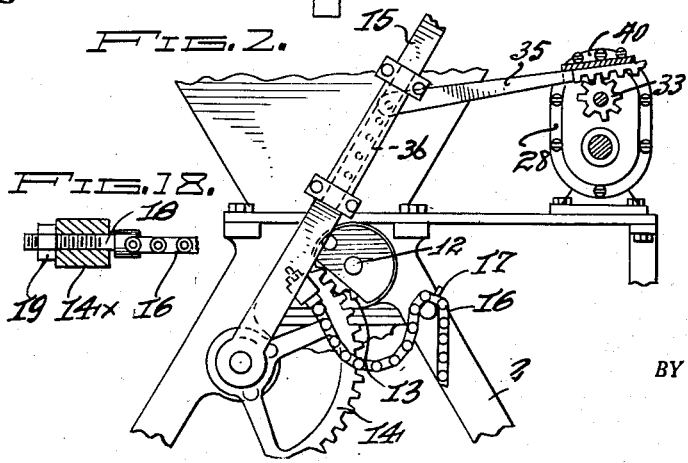
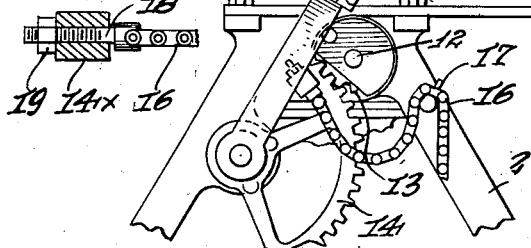
INVENTOR.
Edwin L. Elwell
BY
ATTORNEY.

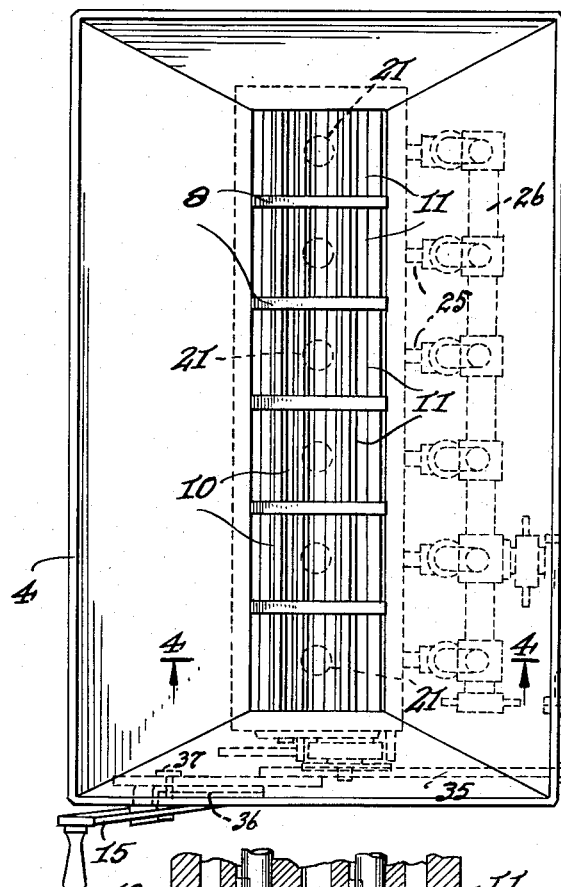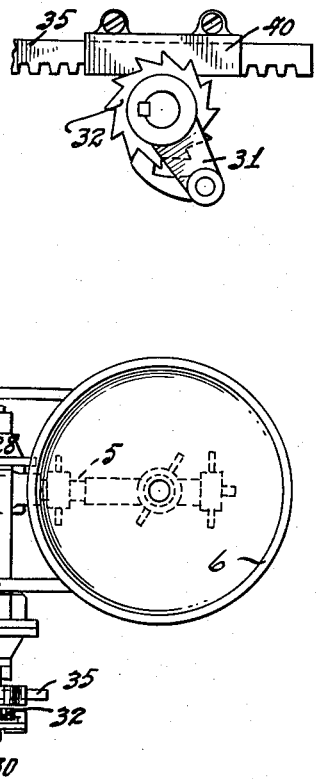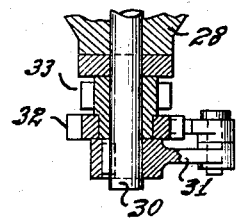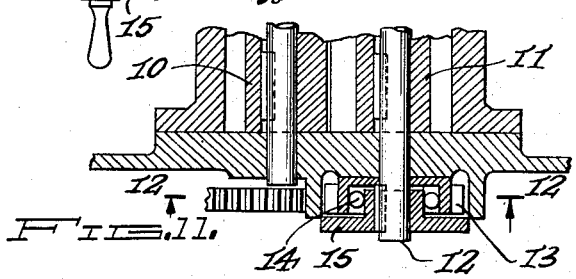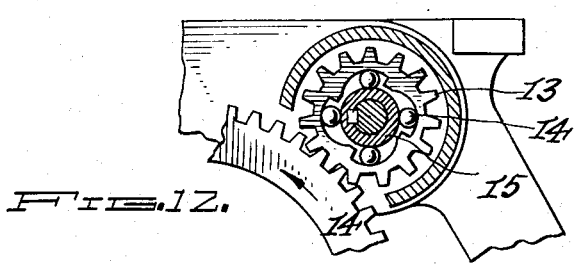

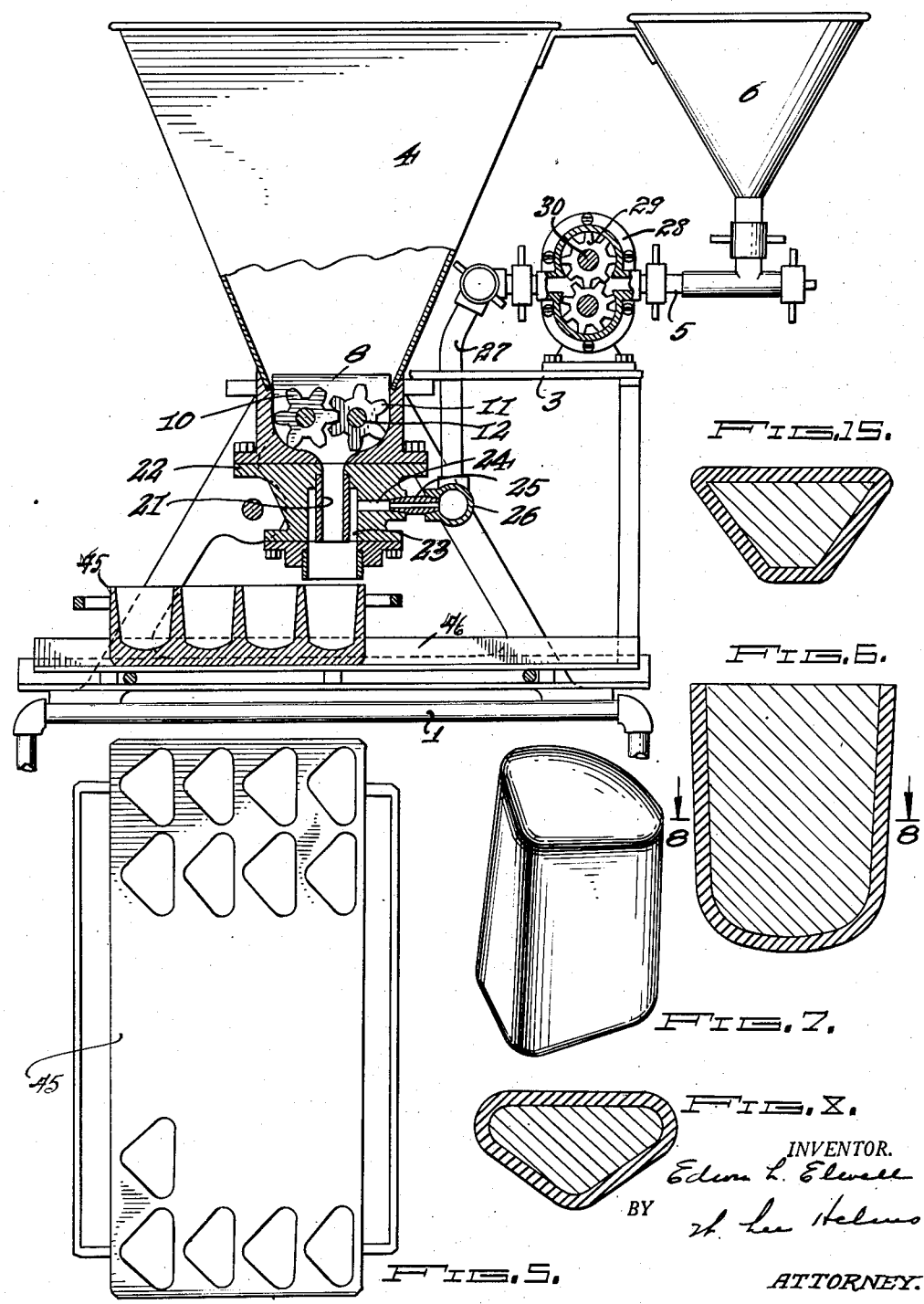

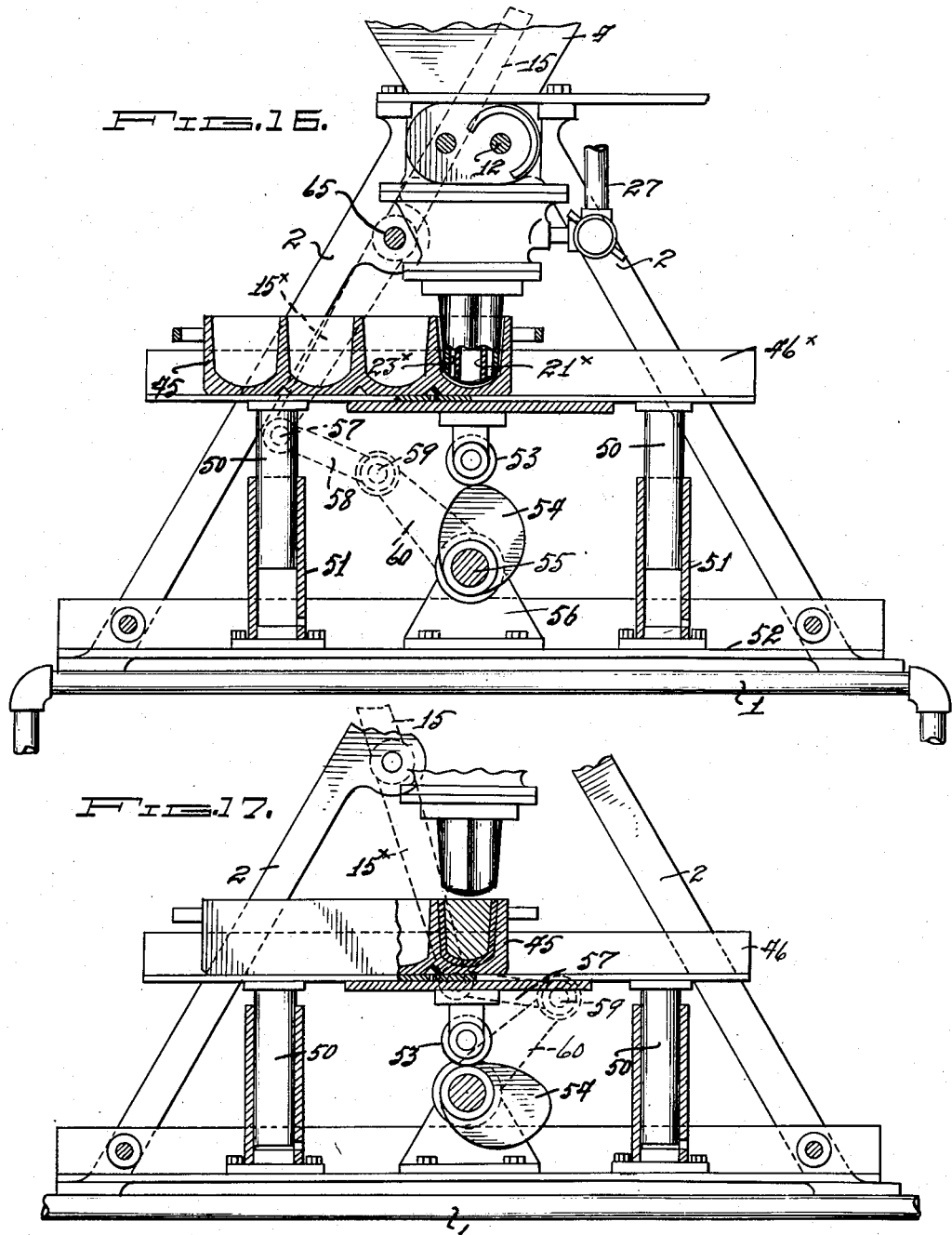

Patented Aug. 25, 1953

2,649,744

UNITED STATES PATENT OFFICE 2,649,744

APPARATUS FOR MAKING COMPOSITE ICE-CREAM CONFECTIONS

Edwin L. Elwell, Lineboro, Md., assignor to Eskimo Pie Corporation, Bloomfield, N. J., a corporation of Delaware Application December 15, 1949, Serial No. 133,114

3 Claims. (Cl. 107—1)

The object of the present invention is to provide apparatus for making frozen confections of two separate kinds of eatable materials, as for example an ice cream center with a covering or shell of sherbet or water ice or a confection consisting of inner and outer bodies of different kinds of ice cream.

The invention will be described with reference to the accompanying drawings in which:

Fig. 1 is a view in elevation and partly broken away, showing an embodiment of the invention at the end of a power stroke of the operating mechanism.

Fig. 2 is a view similar to Fig. 1, but with less detail showing the position of the parts at the beginning of a power stroke.

Fig. 3 is a plan view of certain elements being shown by dotted lines.

Fig. 4 is a vertical section taken generally on the line 4—4.

Fig. 5 is a plan view schematically showing a form of mold, only part of the normally twenty-four cavities being indicated.

Fig. 6 is a vertical section through a frozen confection made by use of the apparatus.

Fig. 7 is a perspective view of the said confection and

Fig. 8 is a horizontal section on the line 8—8, Fig. 6.

Fig. 9 is a vertical section taken on the line 9—9 Fig. 1.

Fig. 10 is a detail view, partly broken away and at the area shown by the lines 10—10.

Fig. 11 is a horizontal section on the line 11—11, Fig. 1.

Fig. 12 is a vertical section on the line 12—12, Fig. 2.

Fig. 13 is a detail view in front elevation showing the rack paul and ratchet means for operating the pump to which is fed the material for the outer portion of the frozen confection.

Fig. 14 is a horizontal section on the line 14—14 Fig. 1.

Fig. 15 is a cross section through another tubular form of composite frozen confection.

Fig. 16 is a view in elevation showing means for raising and lowering the mold during each two strokes, that is to say inactive and active strokes of the operating lever, the view showing the mold raised.

Fig. 17 is a view similar to the preceding figure showing the mold lowered.

Referring to the drawings, I have illustrated therein a supporting frame consisting of what will be in practice parallel inverted U-shaped frame members 1 from which upwardly projects a sub-frame 2 having a platform 3 at its top. On the platform 3 is mounted a container 4 which will receive ice cream or other material for the center of the confection to be formed. The platform also supports a pump casing 4X to which is led a delivery pipe 5 from a chamber 6 which will hold the material for the outer portion of each confection.

Means are provided for securing a measured feed of the material from chamber 4 and a measured feed from chamber 6, and such means will now be described.

Referring to Fig. 4 it will be seen that the container 4 discharges at its base into a plurality of gear pump areas. As shown by reference to Fig. 3 the said pump areas are six in number and are separated by the division walls 8. In each pump area are two gear-type pump-impellers 10, 11. Gear-impeller 11 is mounted on a shaft 12 which is associated with a drive-clutch assembly, the latter being illustrated in detail in Figs. 11 and 12. Loosely surrounding shaft 12 is a ratchet wheel 13 which is interiorly formed with shouldered cam slots which receive balls 14Y adapted to be frictionally pressed upon the hub of an outer clutch member 15 which is keyed to shaft 12. Ratchet wheel 13 is engaged by a rack 14, Figs. 1 and 2. Rack 14 carries an operating handle 15.

In order to limit the active movement of the rack a chain 16 is secured thereto and when the desired length of movement has been determined the length of the chain is hooked over a pin 17 carried by the frame 2. To secure a less than link-length adjustment of the chain the latter carries at its outer end a threaded stem 18, Fig. 18, which loosely fits in a boss 14x carried by the rack 14, a nut 19 being threaded on the exposed end of the stem.

It will be seen from the above that upon a movement of the hand lever 15 to the right from its position to Fig. 1 the clutch arrangement shown in Figs. 11 and 12 will be idle, and when the lever is moved to the right shaft 11 will be in clutching relation with the rack and will be rotated, this rotation depending upon the length of active stroke given to handle 15, as limited by the adjustment of chain 16. Hence the pump elements of container 4 will be actuated and a measured quantity of ice cream or other core material will be discharged from each of the compartments separated by the division walls 8. At the base of each compartment is an outlet pipe 21, so that there will be six outlet pipes.

As shown in Fig. 4 each outlet pipe 21 projects downwardly into a casing member 22 and into a separate compartment of said casing member. The latter may have the exterior shape of the confection to be formed or may simply constitute an enclosure spaced from the appropriate tube 21, but not greater in transverse area than the reception area of the mold cavity into which the material is to be discharged. Therefore casing 22 will have projected downwardly therein a plurality of tubes 21, usually six in number, each tube being encircled but spaced from a receiving area 23 for the material which will comprise the shell or exterior of the confection.

In Fig. 4 the shell receiving area for one discharge tube is indicated at 23. Said area communicates with a port 24 cut through the wall of casing 22 and communicating with a short pipe 25 leading to a manifold 26. That manifold will have five additional pipes such as 25, leading to the five additional tube encircling areas.

Manifold 26 receives the shell or coating material from a pipe 27 leading to the outlet of a gear pump 28 to which the coating material is led under gravity by a pipe 5 from chamber 6.

Means for operating gear pump 28 in synchronism with the pump elements for the center or core material of the product will now be described. The upper gear 29 of the gear pump 28 will be fixed to a shaft 30, Fig. 4. To that shaft is keyed a device 31 constituting a pawl 31 which is engaged by a ratchet wheel 32 which is fixed to a hub loosely mounted on shaft 30 the hub being shown at 33, Fig. 9. The hub carries a gear 33 which is engaged by a rack 35. This rack is adjustably connected to the hand lever 15. A convenient method of adjustment is shown in Fig. 10, which consists of a bar 36 carried by handle 15 and adjustably secured by means of a pin or bolt 37 which may be positioned in any one of the apertures in bar 36. Thus the active movement of rack 35 in a stroke of the hand lever 15 may be varied from that of a previous different adjustment.

In Fig. 1 the rack 35 is at the end of an active stroke. When the hand lever 15 is moved forwardly until it strikes a suitable stop (not shown) it will be ready for an active stroke. In said inactive rack the ratchet 32 will move idly on shaft 30 and the pawl will not be actuated until the ratchet bar is moved to the right from its position in Fig. 1.

Member 40, Figs. 1, 9 and 13 is a guide-guard which may be secured to the pump casing 28 for guiding the ratchet bar 35.

In the operation of the form of the invention shown in Figs. 1 to 5 inclusive, with the detail Figures 9 to 14, a relative adjustment will be effected between rack bar 35 and handle lever 15 to insure that, in a given active stroke, the feed of the core or center material and the feed of the outer or shell material will be as required by the form and capacity of the mold cavities. With the handle lever in the position of Fig. 2 a plural-cavity mold such as that indicated at 45, Fig. 5, will be placed in position upon spaced guide rails on standard 1, one of these guide rails being indicated at 46, and the mold will be moved forwardly until one row of mold cavities is positioned in register with the outlet areas 21, 23, Fig. 4. Handle lever 15 then is given an active movement from the position of Fig. 2 to Fig. 1.

In said active movement the gear pumps are operated for a time determined by the position of any suitable stop member, which will end the stroke of the hand lever. At this point, it should be pointed out that the operating means for the gear pumps may be power elements or a power element such as an electric motor with drive connections to the gear pumps, since this would be an obvious equivalent of the manual-operating means. Thus relatively predetermined measured quantities of the core or center material and the shell material will simultaneously be led into the mold cavities by said active stroke. The hand lever then is returned to initial position, the mold being moved one step further, and upon a second active stroke, the second row of cavities in the mold will be filled, and so on until all of the cavities in the mold are filled, and it will be passed on to a hardening room.

The core or center material and the shell of covering material may be, for example, respectively ice-cream and sherbet or water ice. In such case it is feasible to freeze each of the said two mixtures to a condition where they will have such consistency or plasticity that they will move downward into the mold together and in proper relation. In this connection it will be understood that a substantially continuous supply of the frozen materials may be led from continuous freezers to the gear pumps, or such feed may be intermittent. In such case the frozen materials will not be subjected to more than inconsequential heat-absorption and change in consistency up to the time that they enter the mold cavities.

In some cases it may be desirable to project the mold-feeding nozzles within the mold cavities and relatively move the molds and nozzles during the filling of the cavities. A structure for such purpose is illustrated in Figs. 16 and 17. All of the elements above the trackway 46 may be the same as previously described, except that concentric nozzles are projected below the casing 22 of Fig. 4, these nozzles corresponding to the core-filling nozzle 21 and the shell-forming 23 which surrounds the same.

In Fig. 16 the core-forming nozzle is shown at 21x and its surrounding shell-forming nozzle is shown at 23x. The trackway for the mold, as to one of the trackway elements, is shown at 46x. There will be, of course, two spaced trackway elements upon which the mold will be slidingly supported. These trackways are mounted on posts 50 which slide in vertical sleeves 51 carried by a table element 52 on standard 1. At the base of the trackway assembly is a roller 53 engaged by a cam 54 on a shaft 55 supported by bearings carried by bracket 56. The cam is fixed to shaft 55, in the present example, and the shaft may be rotated by any suitable means in such manner as to move the mold upwardly when any given row of cavities have been brought in register with the nozzles 21x and 23x, which can be done in a return or inactive stroke, as of the handle lever 15.

In Fig. 16 the handle lever is dot-shown, and it will be assumed that it will be associated with all of the elements so associated in Figs. 1 and 2. In the said modification shown in Figs. 16 and 17, the handle lever will have an extension indicated at 15x. At 57 the said extension is pivoted to a link 58 pivotally connected at 59 to a lever 60 on shaft 55. When the handle lever 15 is swung to the left in an active stroke, the gear pumps will simultaneously feed into the mold cavities proper relative proportions of the filling material simultaneously with a lowering of the mold to the position of Fig. 17. Thereupon the mold may be shifted to bring the second set of cavities into register with the nozzles, the hand lever may be moved to the position of Fig. 16, and an active stroke of the hand lever will both retract the mold from the nozzles and fill said second row of cavities.

It will be understood that various modifications may be made in the form and arrangement of the elements constituting the embodiments illustrated in the drawings, without departing from the spirit of my invention.

Although I have shown in the drawings hoppers for containing the partially congealed materials so that those materials, while viscous and of a light plastic nature, will flow by gravity into the pump chambers, it will be understood that the degree of congelation of each material may range from a "mush" characteristic to such a degree of plasticity that the material tends to retain a form in which it is put. In such latter case, force speed conduits from the two sources of supply will lead to the pump chambers and gravity will be dispensed with.

What I claim and desire to secure by letters patent is as follows:

1. An apparatus for simultaneously extruding a measured volume of an annulus of an exteriorly disposed confection about a measured volume of extruded core confection comprising a frame, a first container mounted on said frame for said core confection, a second container supported by said frame for said exterior confection, a first gear pump having a driven shaft and secured dependingly to said first container, a second gear pump having a driven shaft and secured to said second container, a die secured to said first pump and having a centrally disposed tube for emitting the core confection and an annular chamber disposed about said tube for said exteriorly disposed confection, a conduit connecting the outlet of said second pump to said annular chamber, a first lever arm pivoted at its base to said frame, a quadrant gear fixedly secured to the lever arm and pivoted on the lever arm pivot, a driven gear fixed to the driven shaft of said first gear pump and adapted to operate said first gear pump, and a second lever arm pivotally secured centrally to said first lever arm and having gear teeth adapted to operate the driven shaft of said second gear pump, whereby forward movement of said first lever arm simultaneously operates said second lever arm and said first and second gear pumps.

2. An apparatus for simultaneously extruding a measured volume of an annulus of an exteriorly disposed confection about a measured volume of extruded core confection comprising a frame, a first container mounted on said frame for said core confection, a second container supported by said frame for said exterior confection, a first gear pump secured dependingly to said first container, a second gear pump secured to said second container, a die secured to said first pump having a centrally disposed tube for emitting the core confection and an annular chamber disposed about said tube for said exteriorly disposed confection, a conduit connecting the outlet of said second pump to said annular chamber, a first lever arm pivoted at its base to said frame, a quadrant gear secured to the lever arm and pivoted at the lever arm pivot and adapted to operate said first gear pump, and a second lever arm pivotally secured centrally to said first lever arm and having gear teeth adapted to operate said second gear pump, ball bearing ratchets secured to said first gear pump and actuated by said quadrant gear to permit pumping of core confection only during the forward stroke of the first lever arm, and a wheel ratchet secured to a pawl secured in turn to the second gear pump and actuated by said gear teeth of said second lever arm to permit pumping of the exteriorly disposed confection.

3. The apparatus of claim 2 adapted to simultaneously produce a plurality of discrete confections having a core confection surrounded by an exteriorly disposed confection comprising a plurality of first gear pumps, a plurality of dies dependingly secured to said first gear pumps, a header conduit secured to the outlet of the second gear pump, and a plurality of conduits connecting said header to the annular chamber of said plurality of dies.

EDWIN L. ELWELL.

References Cited in the file of this patent

UNITED STATES PATENTS

| Number | Name | Date |
|---|---|---|
| 568,481 | Grebenstein | Sept. 29, 1896 |
| 798,251 | Averay-Jones | Aug. 29, 1905 |
| 1,303,599 | Salerno | May 13, 1919 |
| 1,392,034 | Westerman | Sept. 27, 1921 |
| 1,404,548 | Salerno | Jan. 24, 1922 |
| 1,420,797 | Westerman | June 27, 1922 |
| 1,561,302 | Bausman | Nov. 10, 1925 |
| 1,621,010 | Hall | Mar. 15, 1927 |
| 1,817,383 | Laskey | Aug. 4, 1931 |
| 1,968,183 | Vogt | July 31, 1934 |
| 1,987,084 | Snodgrass | Jan. 8, 1935 |
| 2,042,940 | Herron | June 2, 1936 |
| 2,207,616 | Howser | July 9, 1940 |
| 2,271,767 | Hummel | Feb. 3, 1942 |
| 2,282,313 | Hershey | May 12, 1942 |